Oct. 15, 1968  W. B. STENGLE ET AL  3,406,088
METHOD OF FORMING MULTI-PLY BOARD WITH PLIES
OF DIFFERENT CONSISTENCIES
Filed June 21, 1965
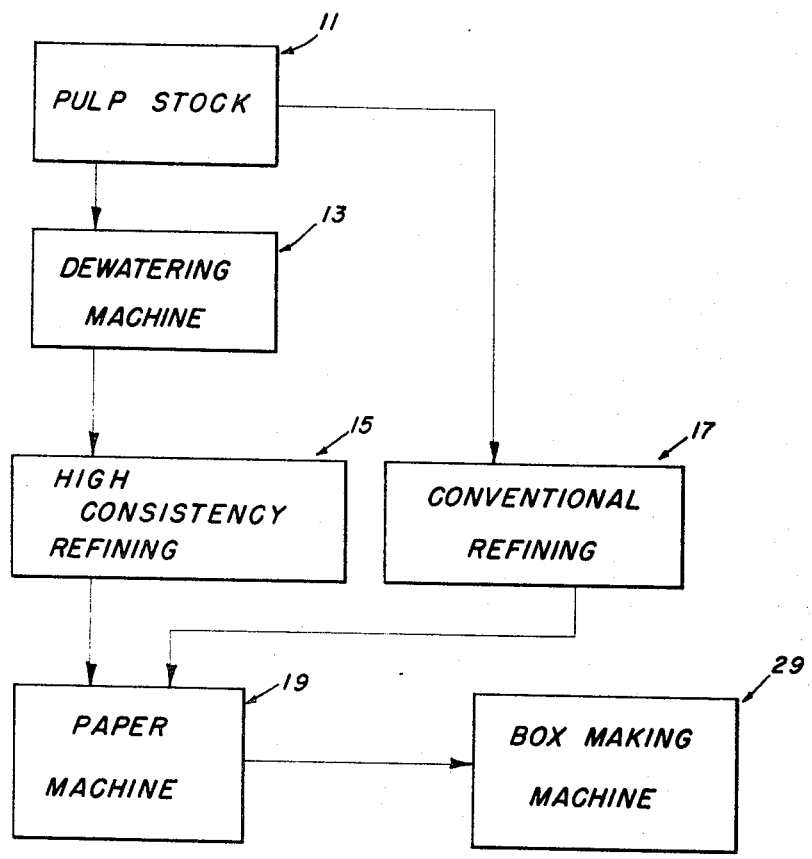
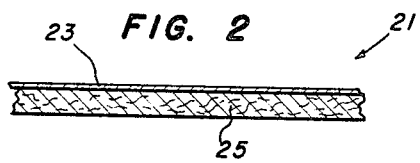
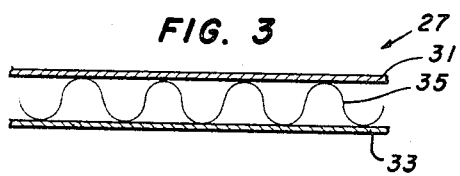
INVENTORS
WILLIAM B. STENGLE
FREDERICK B. SCHELHORN
BY John R. Walker, II
Attorney

United States Patent Office 3,406,088
Patented Oct. 15, 1968

3,406,088
METHOD OF FORMING MULTI-PLY BOARD WITH PLIES OF DIFFERENT CONSISTENCIES
William B. Stengle, Savannah, and Frederick B. Schelhorn, Hardin, Tenn., assignors to Tennessee River Pulp and Paper Company, Counce, Tenn.
Filed June 21, 1965, Ser. No. 465,354
1 Claim. (Cl. 162—125)

ABSTRACT OF THE DISCLOSURE

A process of manufacturing multi-ply paperboards and the resulting product wherein improved bending and folding characteristics are obtained. The method comprises the steps of refining the fibers in plies other than the outer ply at low consistencies and refining the fibers of the outer ply at high consistencies.

---

This invention relates to a method of making multi-ply paperboards and the resulting product thereof. More particularly, the present invention relates to the fabrication of such paperboards which have improved characteristics, especially improved bending or folding characteristics, for use as liners of the corrugating medium in box manufacture or as laminated layers or plies of a solid fiber sheet for the manufacture of containers.

Paperboard for such liners is frequently manufactured on a paper machine that is capable of depositing layers of fibers from two or more sources, as in the case of the Fourdrinier machine with two head boxes, the cylinder machine with multiple vats, or the Inverform machine with multiple head boxes.

In constructing this type of board, the top ply or outer layer which will be on the outside of the box is usually composed of fibers which have been selected or prepared to give the desired shade, appearance, or printability to the box. Our invention pertains to the mechanical treatment of the fibers in this outer ply or layer to improve their strength and thereby improve the bending or folding characteristics of the paperboard, particularly when it is combined as a corrugated board.

Heretofore, there has been the so-called cracking problem or defect which occurred particularly in boxes made from corrugated board. Such corrugated container board is normally composed of two pieces of liner board separated by and glued to a corrugated semi-chemical medium paper. The combination is put together and glued on a corrugating machine. After combining, the board is cut to the proper box size and shape, printed, and then scored with wheels along the lines of fold. The blank is then folded and baled for shipment to the box customer. The cracking is observed after the board has been folded, particularly under dry conditions. The surface of the outer liner cracks open, and the rough edges of the crack are apparent to the eye.

The present invention is particularly directed towards overcoming the above-mentioned and other problems in paperboards used in boxes or containers.

Thus, one of the objects of the present invention is to provide an improved method of making paperboards for use as liners of the corrugating medium in box manufacture or as laminated layers or plies of a solid fiber sheet for the manufacture of containers, and which method results in materially reducing the cracking condition heretofore described while still retaining the other desirable properties of the liner board.

A further object is to provide such a method that includes the step of refining the fibers to be used in the outer plies of the multi-ply paperboards at high consistencies, as, for example, at consistencies of 30% or higher of wood pulp to 70% or lower of water.

A further object is to provide, in the process of manufacturing for use in boxes paperboard of the type having multiple plies of fibers including an outer or top ply, a method of improving the bending or folding characteristics of the boxes in which the paperboard is used comprising the steps of refining the fibers to be used in plies other than the outer ply at consistencies of approximately 3–5% wood pulp to 97–95% water, and refining with disk refiners the fibers of said outer ply at consistencies of 30% or higher of wood pulp to 70% or lower of water.

A further object is to provide paperboard for use in a box which gives improved bending or folding characteristics comprising an outer ply which is formed by refining the fibers thereof with disk refiners at consistencies of 30% or higher of wood pulp to 70% or lower of water.

The means by which the foregoing and other objects of the present invention are accomplished and the manner of their accomplishment will be readily understood from the following specification upon reference to the accompanying drawings, in which:

FIG. 1 is a schematic showing of the steps in the manufacture of the paperboard according to the present invention.

FIG. 2 is an enlarged schematic and sectional view of the resulting product.

FIG. 3 is a schematic view of a portion of a corrugated board box which has been made in accordance with the present invention.

Referring now to the drawings in which the various parts are indicated by numerals, and referring first to FIG. 1, it will be seen that the process is illustrated by a flow sheet, and the pulp stock is indicated by numeral 11. Pulp stock 11 is prepared by any suitable means known to those skilled in the art. Thus, the pulp wood, as pine or hardwood, is processed to remove bark, chipped, cooked in the digester, and further refined, screened, and washed to remove knots and partially uncooked wood and fiber bundles and cooking chemicals. The block diagram, indicated as at 11, indicates the pulp stock after it has gone through the washer and is at a consistency of approximately 3–5% wood pulp and 97–95% water. Part of the pulp stock 11 is processed through a suitable dewatering machine 13, as, for example, suitable presses well-known to those skilled in the art, which increases the consistency of the stock to 30% or higher of wood pulp to 70% or lower of water. This de-watered pulp at the above-mentioned consistencies is fed into a disk refiner of suitable construction well-known to those skilled in the art, as, for example, one in which there are two closely disposed disks which are rotating at high speeds and between which the pulp is fed, or, if desired, one disk may be stationary and the other rotating. An example of such a disk refiner is shown in Patent No. 2,947,485. The above-mentioned refining will be hereinafter designated high consistency refining or HCR and is indicated diagrammatically in the drawings as at 15.

A portion of pulp stock 11 is processed without dewatering and at the normal or regular consistency of approximately 3–5% wood pulp to 97–95% water with conventional refiners, as, for example, similar to the refining machines mentioned in the preceding paragraph. This refining of the pulp at the consistencies hereinabove mentioned will be hereinafter referred to as conventional refining and is designated as at 17 in the drawings.

The pulp from the high consistency refining 15 and the conventional refining 17 are fed into the paper machine, indicated diagrammatically as at 19, which is of any suitable well-known type usch as Fourdrinier with two head boxes, a cylinder machine with multiple vats, or an Inverform machine with multiple head boxes. The resulting product from paper machine 19 is a multi-ply paperboard shown in FIG. 2 as at 21.

Paperboard 21 comprises a top ply or outer layer 23 which is integrally formed with an inner or base layer 25. Outer layer 23 is formed from the pulp from the high consistency refining 15, and inner layer 25 is formed from the pulp from the conventional refining 17. We have found that by forming the paperboard 21 as above described, using high consistency refined fibers in the outer ply 23, improved bending or folding characteristics of boxes or containers can be obtained, particularly when it is combined as a corrugated board, as, for example, like the corrugated board 27 shown schematically in FIG. 3. A box of which the corrugated board 27 is a part is made on a suitable box making machine, indicated diagrammatically as at 29. The corrugated board 27 is formed by two pieces of liner board, an outer liner shown as at 31 and an inner liner shown as at 33, which are separated by and glued to a corrugated semi-chemical medium paper, indicated as at 35. The above-mentioned designations, inner and outer, are used since the liner 31 is on the outside of the box when formed, and the liner 33 is on the inside of the box when formed. We have further found that by using the paperboard 21 as the outer liner 31 of the corrugated board 27, this materially reduces the cracking condition heretofore described while still retaining the other desirable properties of the corrugated board. It will be understood that the inner liner 33 may be formed of paperboard formed from a conventional refining process.

The following data illustrates results that we have obtained using experimental equipment:

RESULTS OF CRACKING TESTS

[Composition of top stock or outer ply—42# liner, 25% top stock, 75% base stock. Base stock refined with conventional refiners to 670 CS freeness]

|  | Percent cracking at 30% relative humidity | |
|---|---|---|
|  | In handsheets | In board |
| (A) Conventional refined to 560 CSF | 87 | 61 |
| (B) High consistency refined to 560 CSF with 14.3 HPD/T at 30% consistency. Conventional refining to final freeness of 530 | 16 | 7 |

The foregoing cracking results were obtained with a laboratory scoring wheel on six inch samples of combined corrugated board. The figures are the percent of the length of the fold that had cracks visible to the naked eye. The boards constructed with high consistency refined pulp in the top ply showed less cracking.

It is believed that this improvement is associated with the increased stretch in the pulp composed of HCR fibers. This stretch is also associated with the amount of cross machine direction shrinkage that takes place as the paperboard is drid. In the above tests, the stretch and shrinkage were as follows:

| Top Stock | Percent of Total Board Length | |
|---|---|---|
|  | Stretch CD | Shrinkage CD |
| (A) Conventional refined | 4.1 | 3.7 |
| (B) High consistency refined | 5.5 | 5.0 |

The HCR top stock boards showed greater shrinkage and greater stretch, and it is believed that this permits it to better absorb the tension of bending and thereby have less cracking.

We have reason to believe that this improvement will be obtained to varying degrees when the pulp is refined at consistencies above 20%, and with varying horsepower inputs from almost none at all to 30 HPD/T (horsepower days per ton).

From the foregoing description it will be understood that, with the use of the present invention, a material reduction in the cracking condition of paperboard used in boxes will be provided, while still retaining the other desirable properties of the liner board. In addition, use of the present invention will be particularly beneficial to manufacturers of corrugated boxes in that the boxes will have a better appearance before assembly and greater rigidity in the corners after assembly.

We claim:
1. In the process of manufacturing paperboard of the type having multiple plies of fiber including an outer or top ply for use in boxes, a method of improving the bending or folding characteristics of the boxes in which the paperboard is used comprising the steps of refining the fibers to be used in plies other than the outer ply to a 530 Canadian Standard Freeness at consistencies of approximately three to five percent wood pulp to ninety-seven to ninety-five percent water, and refining with disk refiners the fibers of said outer ply to a 560 Canadian Standard Freeness at consistencies of thirty percent of wood pulp to seventy percent of water.

References Cited

UNITED STATES PATENTS 2,098,733  11/1937  Sale _____ 162—129

FOREIGN PATENTS 628,603  9/1949  Great Britain.

OTHER REFERENCES

Stephensen, "Beating of Cellulose," August 1947, p. 215.

S. LEON BASHORE, *Primary Examiner.*